No. 751,074. PATENTED FEB. 2, 1904.
W. HIGGINS & W. G. EDMONDS.
MACHINE OR APPARATUS FOR AFFIXING LABELS TO BOTTLES,
BOXES, OR OTHER ARTICLES.
APPLICATION FILED DEC. 12, 1902.
NO MODEL. 5 SHEETS—SHEET 3.
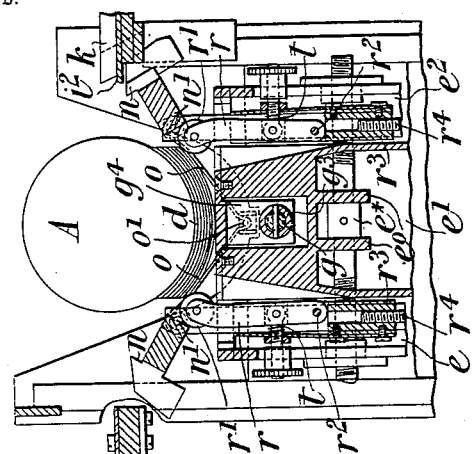
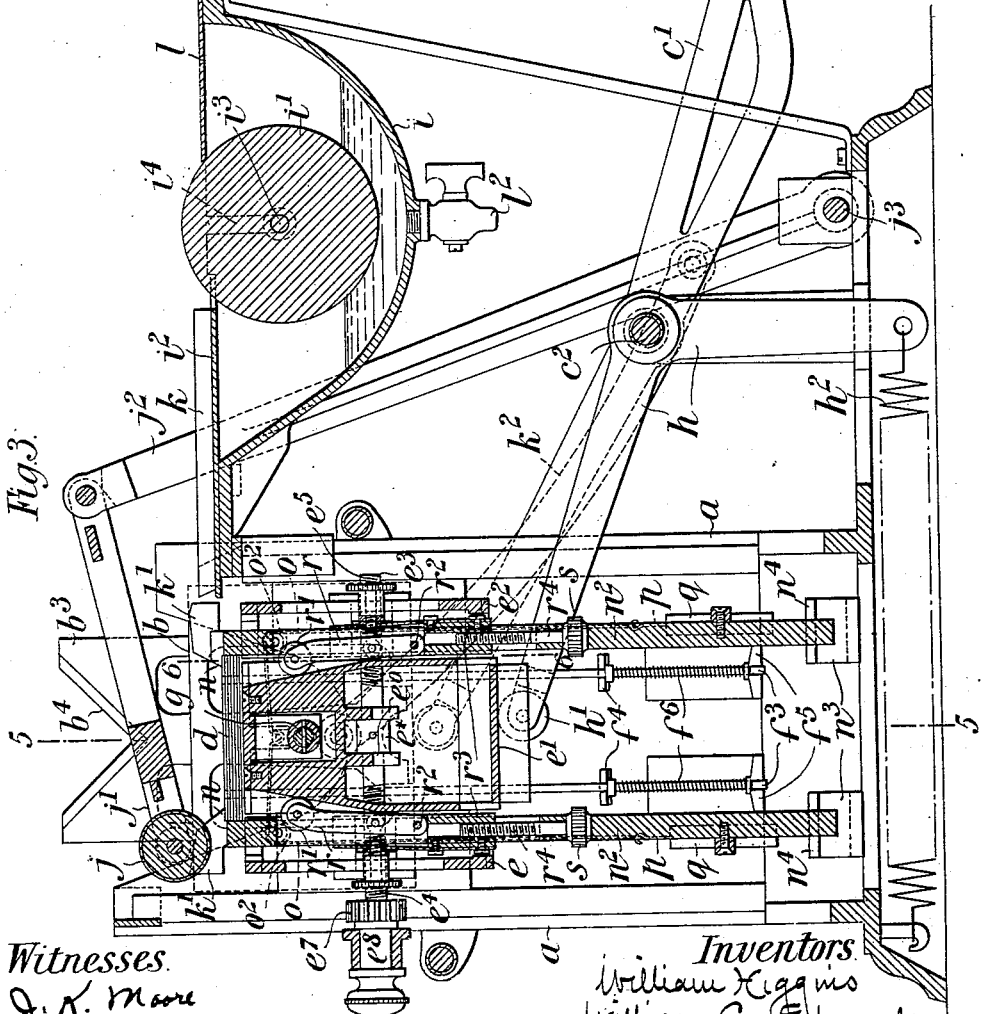
Witnesses.
Inventors.

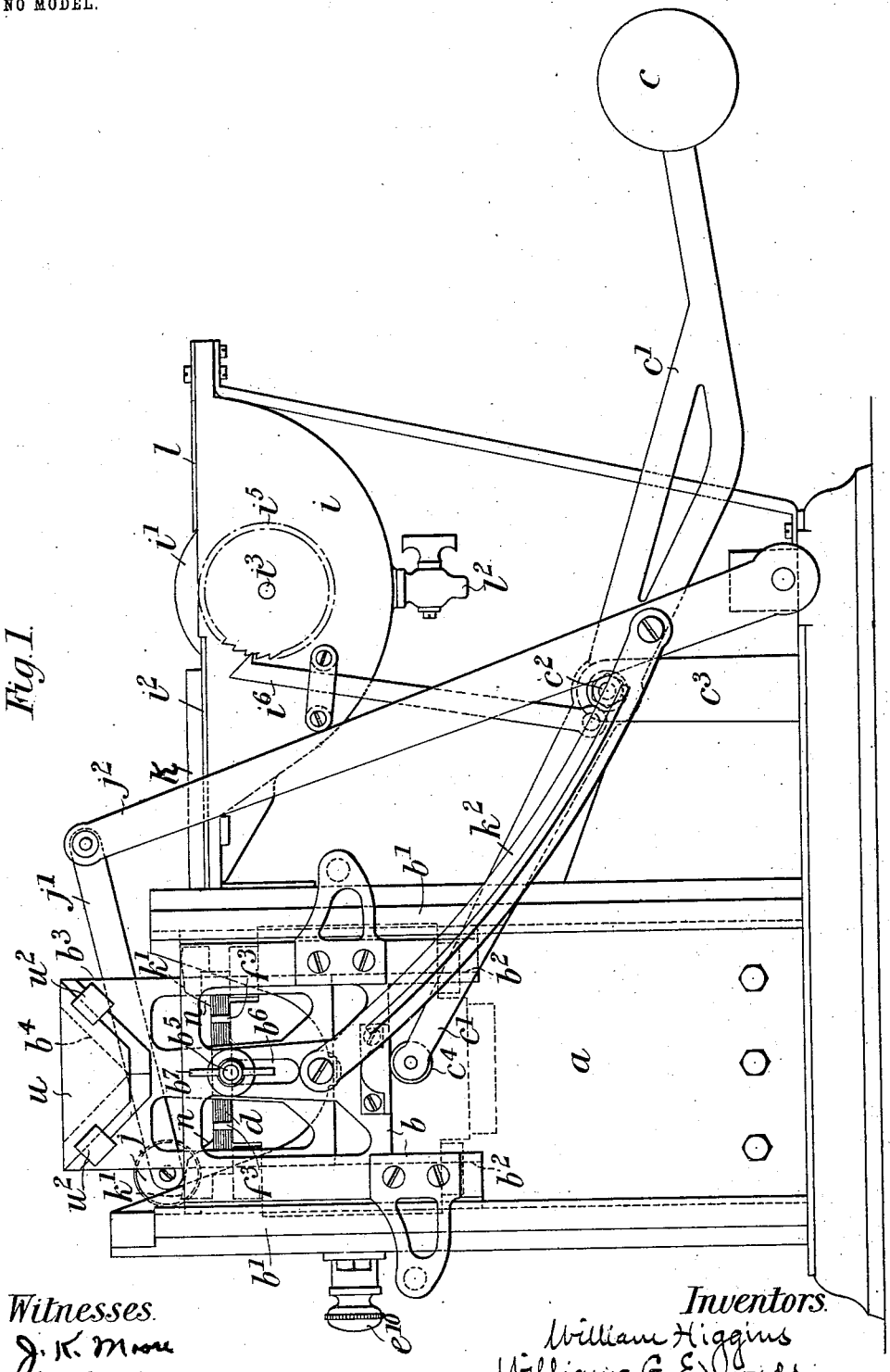

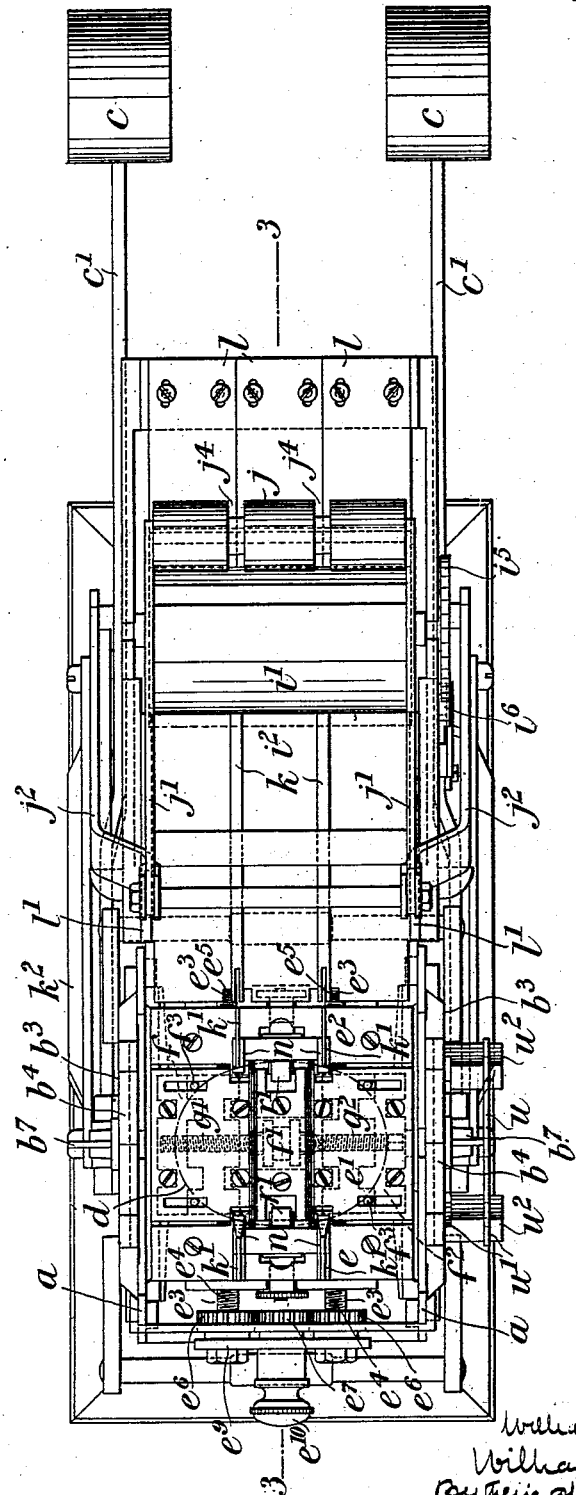

No. 751,074. PATENTED FEB. 2, 1904.
W. HIGGINS & W. G. EDMONDS.
MACHINE OR APPARATUS FOR AFFIXING LABELS TO BOTTLES, BOXES, OR OTHER ARTICLES.
APPLICATION FILED DEC. 12, 1902.
NO MODEL. 5 SHEETS—SHEET 4.

Witnesses.
J. K. Moore
F. H. Hubbard

Inventors.
William Higgins
William G. Edmonds.
By their attys
Whitaker Prevost

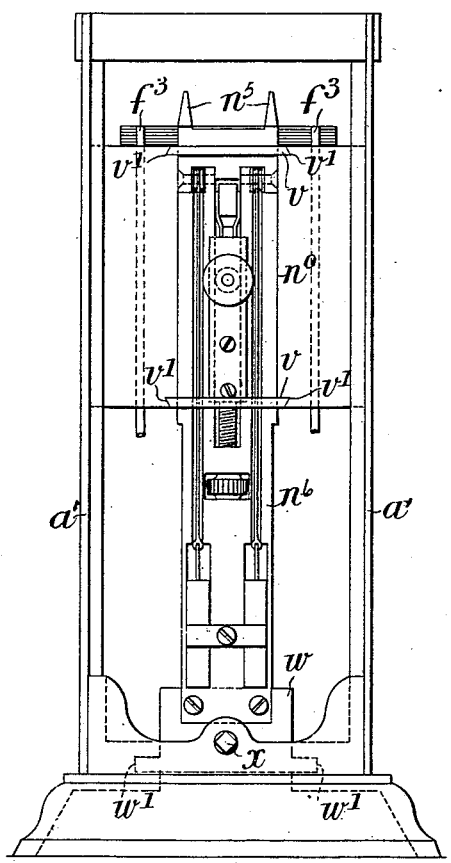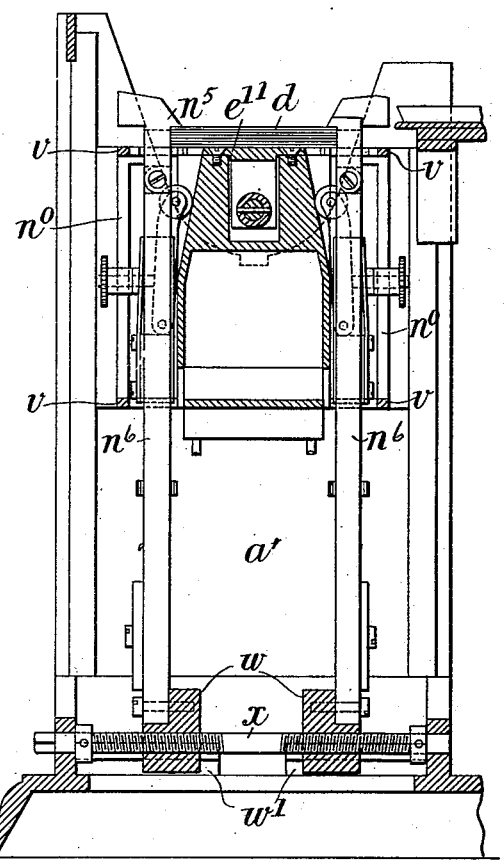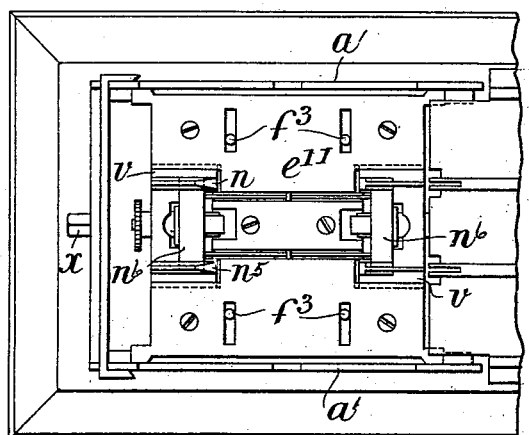

No. 751,074. Patented February 2, 1904.

UNITED STATES PATENT OFFICE.

WILLIAM HIGGINS, OF ROSCOMMON, AND WILLIAM GEORGE EDMONDS, OF DUBLIN, IRELAND.

MACHINE OR APPARATUS FOR AFFIXING LABELS TO BOTTLES, BOXES, OR OTHER ARTICLES.

SPECIFICATION forming part of Letters Patent No. 751,074, dated February 2, 1904.

Application filed December 12, 1902. Serial No. 134,945. (No model.)

*To all whom it may concern:*

Be it known that we, WILLIAM HIGGINS, residing at Corbally, Donamon, P. O. Roscommon, in the county of Roscommon, and WILLIAM GEORGE EDMONDS, residing at 9 Fownes street, in the city of Dublin, Ireland, subjects of the King of Great Britain, have invented a new and useful Machine or Apparatus for Affixing Labels to Bottles, Boxes, or other Articles, of which the following is a specification.

This invention relates to a machine or apparatus for affixing labels to bottles, boxes, and other articles, the object being to provide a machine by means of which labels can be affixed with greater facility than has heretofore been possible.

According to the invention we construct our machine of a support or stand, in connection with which is arranged a slide or support for the bottle or other device to be labeled, the said bottle-support being adapted to move relatively with the main support or stand. Within the stand there is provided a table upon which is placed a pile of labels normally held in position thereon by suitable clips or the like and adapted to be pasted by a roller or the like. The labels are applied by moving the bottle-support and the table or support relatively with one another, so as to cause the labels and bottle to approach one another. While this is being affected, the pasting-roller is removed from the pile of labels, thus uncovering the topmost label and is withdrawn over a roller in a paste trough or receptacle, whereby it is recoated with paste ready for the next label. The bottle is gradually approached to the pile of labels and ultimately comes into contact therewith, means being provided for curving the label in the case of a bottle or other curved article and for applying it closely against the side thereof.

To enable the invention to be fully understood, we will describe it by reference to the accompanying drawings, in which we have shown the invention applied to a bottle-labeling machine.

Figure 5:
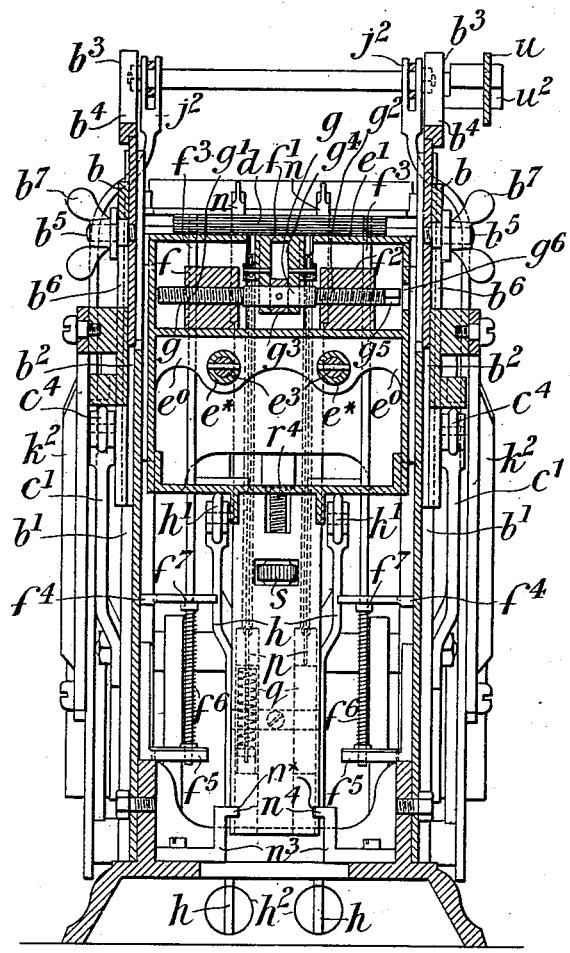
Figure 6:
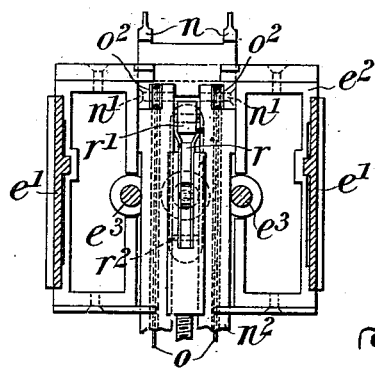

In the said drawings, Figure 1 is a side elevation of the machine arranged for labeling bottles or other cylindrical articles. Fig. 2 is a plan view thereof with the pasting-roller turned back. Fig. 3 is a longitudinal section on the line 3 3, Fig. 2. Fig. 4 is a sectional view of a portion of Fig. 3, but showing the parts in the position in which the label is being applied. Fig. 5 is a vertical section of the machine, the section being taken on the line 5 5, Fig. 3. Fig. 6 is a section on the line 6 6, Fig. 3; and Figs. 7, 8, and 9 are respectively an end elevation, a vertical section, and a plan view illustrating a modification of the machine.

Referring first to the arrangement shown in Figs. 1 to 6, $a$ is the main frame or support, and $b$ is the slide, which is mounted outside the said frame $a$ and is adapted to be reciprocated up and down thereon in guides $b'$ in the said support $a$. The slide $b$ is also formed with guides $b^2 b^2$ for the supports $b^3 b^3$, which are formed at their upper ends with V-shaped notches $b^4$ to take the bottle A and can be adjustably secured in the slide $b$ by means of the screwed studs $b^5$, secured to them and passing through slots $b^6$ in the slide $b$ and of the thumb-nuts $b^7$. $c\ c$ are weights for holding the frame $b$ in its uppermost position—that is to say, in the position shown in Figs. 1, 2, 3, and 5—the said weight being fixed upon the ends of levers $c'\ c'$, pivoted upon the transverse spindle $c^2$, mounted in the brackets $c^3\ c^3$ on the frame $a$, the said levers having at their free ends rollers $c^4\ c^4$, which bear against the under side of the slide $b$. With this arrangement it will be obvious that as the frame $b$ is pushed downward the weights $c$ are raised, and when the frame $b$ is relieved of pressure the weights will again descend, pushing up the frame $b$ to its initial position.

Within the support $a$ there is mounted the table or label-holder for receiving the pile of labels $d$, the said table being preferably made of a number of parts, here shown as three parts $e\ e'\ e^2$, this construction being adopted to enable the table to be expanded and collapsed to take labels of different sizes. In the construction shown the three parts are mounted upon transverse spindles or pins $e^3 e^3$, which are longer than the width of the table when the three parts are closed up together, as clearly indicated in Figs. 1, 2, and 3, and which are formed with screw-threads at their two ends, the central parts being provided with collars $e^*$, held between ribs $e^0$ on the part $e'$ of the table. The screw-threads $e^4 e^4$ are right-hand threads and engage internally-screw-threaded holes in the part $e$ of the table, while the screw-threads $e^5 e^5$ are left-handed and engage internally-screw-threaded holes in the part $e^2$ of the table. It will therefore be clear that by rotating the pins $e^3$ in the same direction simultaneously the parts $e$ and $e^2$ can be separated from or approached toward the central part $e'$ of the table. To enable the pins $e^3$ to be simultaneously turned, we provide upon a projecting part of each a toothed pinion $e^6$, the said pinions gearing with a pinion $e^7$ on a spindle $e^8$, mounted in a bracket $e^9$, supported by the said projecting ends of the spindles $e^3$, the said spindle $e^8$ having a knob or handle $e^{10}$, by means of which it can be turned, so as to simultaneously rotate the screw-pins $e^3$ in the same direction. The central part $e'$ of the label-table is recessed at its upper part, the recessed portion containing three blocks $f$, $f$,' and $f^2$, the central block $f'$ being rigidly secured to the top of the said central part $e'$ of the table, but the other two blocks $f$ and $f^2$ being loose therein and each having loosely passing through it a pair of rods or pins $f^3$, which extend downward through slots in the bottom of the table and through slotted brackets $f^4 f^5$, and are normally held in their uppermost position—that is to say, so as to project through the top of the table in which slots are made for the purpose by springs $f^6 f^6$, which are coiled around them and which bear at one end against the brackets $f^5$ and at the other end against shoulders $f^7$ upon the said rods, the said shoulders bearing against the brackets $f^4$ to limit the upward movement of the rods $f^3$. These rods $f^3$ are designed to hold the labels in position upon the table, the said labels being placed in the space inclosed by the projecting ends of the said rods, the length of rod projecting above the face of the table, when the label-table is in its uppermost position, as shown in Figs. 1, 2, 3, and 5, being always equal to the thickness or height of the pile of labels upon the table. As the labels are depressed the said pins rise above the top of the label pile and come into contact with the bottle or the like being labeled, upon which they are forced down by the springs $f^6$ and allow the label to be affixed, as hereinafter described. To enable the space between the pins to be adjusted to take labels of different sizes, we mount the loose blocks $f$ and $f^2$ upon a rod $g$, which is screw-threaded at its two ends with right and left hand threads $g'$ and $g^2$, respectively, the central portion of the screw-threaded rod being plain and adapted to rotate in a hole provided in the central block $f'$. To hold the rod $g$ in position, it is provided at its center with a collar $g^3$, which is held in a recess $g^4$ in the said central block $f'$. With this arrangement it will be clear that by turning the rod $g$ $g'$ by means of the squared end $g^5$ by means of a key inserted through the hole $g^6$, formed in the side of the table for the purpose the two blocks $f$ and $f^2$ can be moved toward or away from one another, as may be desired, so as to adjust the distance between the opposite pairs of rods $f^3$, and thus enable the table to take larger or smaller labels, the said rods traversing the slots in the top and bottom of the table and in the brackets $f^4 f^5$ hereinbefore described.

The table $e$ $e'$ $e^2$ is normally held in its uppermost position by means of the bell-crank levers $h$ $h$, mounted on the spindle $c^2$, the ends of the long arms of the said levers being provided with rollers $h'$ $h'$, which bear against the under side of the said table, while the other ends of the said levers are connected to springs $h^2$, secured on the base of the support $a$.

$i$ is the paste-trough, which is bolted to the support $a$ and which contains the paste-roller $i'$, the upper surface of which projects above a paste-distributing table $i^2$ at the top of the said trough and which roller is mounted upon pivots $i^3$, supported in slot-bearings $i^4$ in the sides of the trough.

$j$ is the pasting-roller, which is rotatably mounted in the free end of a frame $j'$, the other end of which is pivoted to a swinging frame $j^2$, pivoted to the support $a$ at $j^3$. The pasting-roller $j$ is grooved, as shown at $j^4$ $j^4$, the grooves engaging ribs or rails $k$ $k$ upon the table $i^2$ and also ribs $k'$ upon clips or holders, hereinafter described, for holding the labels on the table $e$ $e'$ $e^2$, the said ribs $k'$ being inclined downward toward the center of the table, as clearly shown, so that the roller as it advances is allowed first to slide upon the top of the table and then to run up onto the ribs $k'$ above the part $e$ of the table, thus being raised off the surface of the labels. The pasting-roller is normally retained in this position by means of the slide $b$, which is held in its uppermost position by the weights $c$ $c$, as hereinbefore described, the said slide $b$ being connected to the swinging frame $j^2$ by means of the links $k^2$. The position of the links $k^2$ is such that when the slide $b$ is depressed by means of the bottle to be labeled the pasting-roller is withdrawn onto the roller $i''$, so as to gather paste therefrom to paste the next label on again returning to its normal position, as hereinafter described. To enable the roller $i'$ each time to present a new surface to the pasting-roller $j$, we provide one of its pivots $i^3$ with a ratchet-wheel $i^5$, with which engages a pawl $i^6$, pivoted to one of the levers $c'$, whereby as the said levers are operated when a bottle is being labeled the pawl is drawn downward, so as to move the ratchet-wheel through one tooth, the pawl being held in engagement with the ratchet by gravity.

$l\ l\ l$ are three gages which are screwed to the rear of the paste-trough and are designed to regulate the thickness of the paste which is retained upon the roller $i'$. For pasting oval labels we prefer in practice that the gages shall allow a thicker film of paste to adhere to the center of the roller than to the sides thereof, as the ends of the pasting-roller $j$ do not require as much space as the central portion.

$l'$ represents lateral ribs or projections provided upon the table $i^2$ to prevent the paste from escaping over the edges when squeezed out laterally as it runs over the said top. $l^2$ is a discharge-cock for withdrawing the paste from the trough $i$.

The labels are normally held in position upon the table by means of clips or holders $n$ $n$, actuated as hereinafter described, the said clips being pivoted on spindles $n'\ n'$, mounted in pillars $n^2$, which pass through grooves in the parts $e\ e^2$ of the table and are secured to the frame $a$ against vertical movement by brackets $n^3$. To enable the said pillars to move with the parts $e\ e^2$ of the table when the said parts are adjusted relatively with the part $e'$, as hereinbefore described, said pillars are provided with grooves $n^\times$, with which ribs $n^4$ on the brackets engage, as shown clearly in Fig. 5.

The machine is employed as follows: The bottle A to be labeled is placed within the recess $b^4$ in the slide $b^3$, as above described, and is then depressed until the portion thereof to which the label is to be affixed comes into contact with the topmost label $d$, the pasting-roller $j$ having been removed by the movement of the slide $b$ in the manner explained above. When the bottle comes into contact with the pile of labels $d$, the pressure causes the table $e\ e'\ e^2$ to yield, and when the upper surface of the said table has sunk to about the plane of the pivots of the clips or holders $n$ the lowermost label comes into contact with a number (in the drawings two are shown) of transverse cords $o\ o$, which pass beneath pins $o'\ o'$ in the central part $e'$ of the table and over pulleys $o^2$, loosely mounted upon the pivots $n'\ n'$, carrying the said clips, the ends of the said cords being attached to pins $p\ p$ in cylinders $q\ q$, containing springs exerting a downward pull upon the cords. The cylinders are fixed in the pillars $n^2\ n^2$, carrying the pivots $n'\ n'$. The further depression of the table thereupon causes the labels to assume the curved form shown in Fig. 4—that is to say, causing them to take a curvature to fit the contour of the bottle A. As soon as the labels are depressed the clips $n\ n$ fall backward upon their pivots into the position indicated in Fig. 4 under the action of gravity and remain in this position until the table $e\ e'\ e^2$ again rises when the label has been applied. When this occurs, the labels reassume their original flat form, and the upper edges of the tabel parts $e\ e^2$ come into contact with the clips $n$ and again raise them to their normal or locking position, holding them there until the table is again depressed.

To enable the label to be tightly applied against the bottle at the edges, we make use of arms $r\ r$, having rollers $r'\ r'$ at their outer ends, which said rollers are adapted to be pressed against the edges of the labels, as clearly shown in Fig. 4. These arms $r$ are pivoted at $r^2$ to frames $r^3$, carried by screws $r^4$, which are rotatably supported in the pillars $n^2\ n^2$, heads $s\ s$ being provided to rotate the screws, and thus enable the said frames $r^3$ to be raised and lowered to adjust the device for labels of different sizes. These arms are normally caused to incline inward and assume the position indicated in Fig. 3 by springs $t$, mounted in the frames $r^3$ and bearing against the said arms. As the labels are depressed in the position shown in Fig. 4, the arms are caused to yield against the action of the springs which apply the rollers $r'$ with the necessary force against the edges of the said labels.

$u$ is a plate carried in notches $u'$ in projections $u^2$ on the slide $b^3$ at one side of the machine, and serving as a stop or gage, against which the bottom of the bottle to be labeled is placed, thus insuring the labels all being affixed at the same height on the bottles.

Figs. 7, 8, and 9 illustrate a modified construction of the machine wherein the label-table is made in one part $e''$ instead of in three parts, as hereinbefore described. In this case, therefore, the clips $n^5\ n^5$ are made adjustable, and to this end the pillars $n^6\ n^6$, upon which they are mounted, are located in vertical slots or grooves $n^0\ n^0$ in the table $e''$. Sockets $v\ v$ are provided at the top and bottom of the table, the said sockets sliding in lateral guides $v'\ v'$ in the grooves $n^0\ n^0$, as clearly shown, to permit of lateral adjustment of the clips. The lower ends of the pillars $n^6$ are secured to blocks $w\ w$, moving in guides $w'$ in the main frame $a'$. To simultaneously adjust these two blocks in their guides, we make use of the right and left handed screw $x$, which engages screw-threaded holes in the said blocks whereby when it is turned it moves the blocks and thereby the clips $n^5\ n^5$ toward or away from one another.

Having now particularly described and ascertained the nature of our said invention and in what manner the same is to be performed, we declare that what we claim is—

1. In apparatus for affixing labels to bottles, boxes and other articles, the combination with a label-table, of a frame for carrying the article to be labeled, movable toward and from the label-table, in a path perpendicular to the said label-table, whereby the article may be placed in engagement with said frame and moved with the frame into engagement with the label, substantially as described.

2. In apparatus for affixing labels to bottles, boxes and other articles, the combination with a label-table, of a frame for carrying the article to be labeled, movable toward and from the label-table, in a path perpendicular to the said label-table, a label-pasting device and mechanism for moving said device across the label-table, substantially as described.

3. In apparatus for affixing labels to bottles, boxes and other articles, the combination with a label-table, of a frame for carrying the article to be labeled, movable toward and from the label-table, in a path perpendicular to said label-table, a label-pasting device, mechanism for moving said device across the label-table and operative connections between said mechanism and said movable frame, substantially as described.

4. In apparatus for affixing labels to bottles, boxes and other articles, the combination with a yielding label-table, of a frame for carrying the article to be labeled, movable toward and from said table in a path perpendicular to said label-table and flexible bands normally below the plane of the label-table for directly engaging the labels and forcing them to conform to the surface of the article to be labeled, substantially as described.

5. In apparatus for affixing labels to bottles, boxes and other articles, the combination with a yielding label-table, of a frame for carrying the articles to be labeled, movable toward and from said table in a path perpendicular to the said label-table, flexible yielding bands normally below the plane of the label-table for directly engaging the labels and forcing them to conform to the surface of the article to be labeled, substantially as described.

6. In apparatus for affixing labels to bottles, boxes and other articles, the combination with a yielding label-table, of a frame for carrying the article to be labeled, movable toward and from said table, flexible bands normally lying below the plane of the table for forcing the labels to conform to the surface of the article to be labeled and springs connected to said flexible bands, substantially as described.

7. In apparatus for affixing labels to bottles, boxes and other articles, the combination with a yielding label-table, of a frame for carrying the article to be labeled, movable toward and from said table, clips pivoted to stationary parts of the apparatus and constructed to hold the labels upon said table, whereby said clips are permitted to release said labels when the table is depressed, and devices connected with the table adapted to engage said clips and restore them to normal position as the table rises, substantially as described.

8. In apparatus for affixing labels to bottles, boxes and other articles, the combination with a label-table, of a frame for carrying the article to be labeled, movable toward and from said table in a path perpendicular to the said label-table, a counterbalance connected to said frame for restoring it to its normal position away from the table, a pasting device for said labels movable across the label-table and connections between said pasting device and said frame, substantially as described.

9. In apparatus for affixing labels to bottles, boxes and other articles, the combination with a yielding label-table, adapted to hold a plurality of superposed labels, said table being adjustable to support labels of different sizes, supports carried by said table and adjustable laterally therewith, but mounted so as to be incapable of yielding longitudinally, clips pivoted to said supports and provided with devices for extending over the labels and holding them upon the table, whereby the clips are permitted to release the labels, when the table is depressed, and means for restoring said clips to their normal position when the table rises, substantially as described.

10. In apparatus for affixing labels to bottles, boxes and other articles, the combination with a yielding label-table adapted to hold a plurality of superposed labels, of a frame for carrying the article to be labeled movable toward and from the label-table in a path perpendicular thereto, a series of pins projecting from the face of the label-table and adapted to yield with a respect to the table, non-yielding supports extending through said table, clips pivoted thereto and provided with horizontal projections engaging said labels and holding them upon the table, whereby said clips are permitted to release said labels when the table is depressed and means for restoring said clips to their normal position as the table rises, substantially as described.

11. In apparatus for affixing labels to bottles, boxes and like articles, the combination with a yielding table, of a frame for holding the article to be labeled, movable toward and from said table on a path perpendicular thereto, said label-table being formed in sections, adjusting devices for said sections to vary the size of the label-table, a series of spring-actuated pins projecting from the face of the table for engaging the lateral edges of the labels, independent devices for laterally adjusting said pins with respect to the table, vertical non-yielding pillars extending through separate sections of said table and adjustable laterally therewith, clips pivoted to said pillars, and having projections to engage the outer face of the pile of labels, to hold them in engagement with the table, whereby said clips are permitted to release the labels when the table is depressed, and means for restoring said clips to normal position as the table is returned to normal position, substantially as described.

12. In apparatus for affixing labels, the combination with a yielding label-table, of a frame movable toward and from said table and adapted to receive the article to be labeled, and laterally-arranged bearers, secured to stationary parts for pressing the edges of the labels against the article to be labeled, substantially as described.

WILLIAM HIGGINS.
WILLIAM GEORGE EDMONDS.

Witnesses:
 JAMES FOX,
 RUFUS WATERMAN.